United States Patent [19]

Schievelbein

[11] 4,237,018

[45] * Dec. 2, 1980

[54] SURFACTANT FLOODING OIL RECOVERY PROCESS

[75] Inventor: Vernon H. Schievelbein, Houston, Tex.

[73] Assignee: Texaco Inc., White Plains, N.Y.

[*] Notice: The portion of the term of this patent subsequent to Feb. 5, 1997, has been disclaimed.

[21] Appl. No.: 37,182

[22] Filed: May 7, 1979

[51] Int. Cl.$^3$ ............................................. E21B 43/22
[52] U.S. Cl. ................................ 252/8.55 D; 166/275; 252/314
[58] Field of Search ................... 252/8.55 P, 314, 353; 166/274, 275

[56] References Cited

U.S. PATENT DOCUMENTS

| | | | |
|---|---|---|---|
| 3,500,923 | 3/1970 | Reisberg | 252/8.55 X |
| 3,637,014 | 1/1972 | Jones | 166/273 |
| 3,663,477 | 5/1972 | Ahearn | 252/8.55 X |
| 3,811,507 | 5/1974 | Flournoy et al. | 252/8.55 X |
| 3,827,497 | 8/1974 | Dycus et al. | 166/274 |
| 3,888,308 | 6/1975 | Gale et al. | 166/274 X |

*Primary Examiner*—Herbert B. Guynn
*Attorney, Agent, or Firm*—Carl G. Ries; Robert A. Kulason; Jack H. Park

[57] ABSTRACT

The effectiveness of a surfactant waterflooding oil recovery process employing an aqueous, saline fluid containing an alkylpolyalkoxy sulfate or an alkylarylpolyalkoxy sulfate is increased substantially if the fluid is subjected to a high shear for a predetermined period of time prior to injecting the fluid into the oil-containing formation. The surfactant fluid should be subjected to a shear rate of at least 150 and preferably at least 250 reciprocal seconds for a period of time of at least 0.1 minutes and preferably at least 0.5 minutes. The improvements obtained by shearing the surfactant fluid include increased stability of the solution, i.e., resistance to separation into separate, distinct phases, reduced turbidity of the fluid which provide improved injectivity with reduced well plugging problems, and attainment of significantly lower interfacial tension between the aqueous surfactant fluid and formation petroleum, and more effective oil displacement from reservoir rock.

7 Claims, No Drawings

SURFACTANT FLOODING OIL RECOVERY PROCESS

CROSS REFERENCE TO RELATED APPLICATION

This application is related to copending application Ser. No. 858,926 filed Dec. 9, 1977, now U.S. Pat. No. 4,187,073, for "Surfactant Flooding Oil Recovery Process".

FIELD OF THE INVENTION

This invention pertains to a surfactant water flooding oil recovery process. More specifically, this invention pertains to a surfactant flooding oil recovery process in which the fluid is first treated to improve its stability, injectivity, and effectiveness for a low surface tension oil displacement.

BACKGROUND OF THE INVENTION

Petroleum is found in subterranean formations or reservoirs in which it has accumulated, and recovery is usually accomplished initially by so called primary production comprising pumping or permitting the petroleum to flow to the surface of the earth through wells drilled into and completed in the subterranean petroleum formation. Petroleum can be recovered from subterranean formations only if certain conditions exist. There must be an adequate concentration of petroleum in the formation and there must be adequate permeability or interconnected flow channels throughout the formation to permit the flow of fluids therethrough if sufficient pressure is applied to the fluid. When the subterranean, petroleum-containing formation has natural energy present in the form of an underlying active water drive, solution gas, or a high pressure gas cap above the petroleum within the formation, this natural energy is utilized to recover petroleum. In the primary phase of petroleum recovery, petroleum flows to wells drilled into and completed in the formation, the petroleum being displaced toward the wells by naturally-occurring energy in the formation. When the natural energy source is depleted, or in the instance of those formations which do not originally contain sufficient natural energy to permit primary petroleum recovery operation, some form of supplemental recovery process must be applied to the reservoir. Supplemental recovery is frequently referred to in the literature as secondary or tertiary recovery, although in fact it may be primary, secondary or tertiary in sequence of employment.

Petroleum recovery operations involving the injection of water into the formation for the purpose of displacing petroleum toward the producing wells, commonly referred to as water flooding or secondary recovery, is the most economically and widely practiced form of supplemental recovery. Water does not displace petroleum efficiently, however, since water and oil are immiscible and the interfacial tension between water and oil is quite high. Persons skilled in the art of oil recovery have recognized this weakness of water flooding and many additives have been described in the prior art for decreasing the interfacial tension between the injection water and the formation petroleum. Petroleum sulfonates have been disclosed in many references for use in surfactant water-flooding oil recovery operations, but petroleum sulfonates have limitations with respect to formation water salinity, hardness, and other factors which restrict the usefulness thereof. U.S. Pat. No. 3,811,504 describes a three component surfactant system comprising an anionic surfactant such as alkyl or alkylaryl sulfonate plus a nonionic surfactant such as polyethoxylated alkyl phenol and a alkylpolyethoxy sulfate. U.S. Pat. No. 3,811,505 describes a dual surfactant system employing an anionic surfactant such as an alkyl or alkylaryl sulfonate or phosphate, plus a nonionic surfactant such as a polyethoxylated alkyl phenol or polyethoxylated aliphatic alcohol. U.S. Pat. No. 3,811,507 describes an oil recovery method using a dual surfactant system comprising anionic surfactants such as a linear alkyl or linear alkylaryl sulfonate, plus a sulfated polyethoxylated aliphatic alcohol. These systems permit the use of surfactant flooding processes in formations containing water containing from 500 to 12,000 parts per million polyvalent ions, such as calcium and magnesium. U.S. Pat. No. 4,018,278 relates to a surfactant oil recovery process suitable for use in high temperature formations containing very high salinity formation water, employing a single surfactant-containing fluid, the surfactant being an alkylpolyethoxy sulfonate or an alkylarylpolyethoxy sulfonate in a saline fluid whose salinity is about equal to the salinity of the formation water. U.S. Pat. Nos. 3,827,497 and 3,890,239 relate to a surfactant fluid and an oil recovery processes employing a fluid containing an organic sulfonate, a sulfated or sulfonated oxyalkylated alcohol and a polyalkylene glycol alkyl ether. U.S. Pat. No. 3,333,634 describes an oil recovery method employing a shear-thickening surfactant fluid containing an alkylaryloxypoly(ethoxy)ethanol and a dialkyl sulfosuccinate. U.S. Pat. Nos. 3,500,923 and 3,508,612 describe oil recovery fluids and methods employing alkylpolyethoxy sulfates and alkylarylpolyethoxy sulfates.

The surfactant fluid to be injected into a subterranean, petroleum-containing formation for petroleum recovery purposes are routinely injected into a relatively low permeability formation, and so the injectivity of the fluid is of critical importance. The presence of dispersed particulate matter which may cause plugging of the subterranean formation will lead to serious problems, since the fluid must be injected into the formation over long periods of time, and plugging is especially significant if it occurs in the portion of the petroleum-containing formation immediately adjacent to the injection wells. Injectivity is most critical at the formation face at the wellbase since this is most likely to have suffered permeability loss due to the drilling and completion operation, and the area through which the fluid passes is smallest near the wellbase.

The fluid must be present in the relatively hostile environment of the subterranean, petroleum-containing formation for long periods of time, in the order of many months to several years, as it passes through the portion of the formation to be swept by the injected fluid between the injection well and production well. The fluid must, therefore, remain relatively stable, both chemically and physically, over the period of time it will be present in the formation. Phase instability is frequently encountered in the use of the more complex surfactants which are used for recovering oil form formations containing relatively high salinity water. Once phase instability has occurred, the oil recovery effectiveness of the fluid is destroyed, and so it is of paramount importance to ensure that the fluid remains phase stable for the period of time it remains in the formation. Finally, the fluid will effectively displace oil from the microscopic pores, including the smaller flow channels and dead-end pore spaces of the formation, only if the interfacial tension, i.e., the surface tension between the aqueous surfactant-containing phase and the formation petroleum can be maintained at a very low level. Accordingly, it can be appreciated that attainment of the lowest possible interfacial tension is of critical importance to the successful application of the surfactant fluid in oil recovery operations.

It is, therefore, an object of the present invention, to provide a method for treating the surfactant fluid to increase the ease with which it is injected into a relatively low permeability oil formation without encountering injectivity or plugging problems.

It is a further object of the present invention to provide a method for treating the fluid to increase the stability of the surfactant fluid, thereby increasing the time which the surfactant fluid will remain in the necessary single phase condition in the formation without separating into multiple phases which degrades the effectiveness of the surfactant fluid for surfactant flooding purposes.

It is still another object of the present invention to provide a method for treating a surfactant fluid to be used for surfactant flooding oil recovery purposes, so as to increase the effectiveness of the fluid for reducing interfacial tension between the surfactant fluid and formation petroleum, thereby increasing the microscopic displacment efficiency of the surfactant fluid.

At least certain of the foregoing objects will be met by at least some of the preferred embodiments of my invention to be described more fully hereinafter below.

SUMMARY OF THE INVENTION

Briefly, my invention concerns an improvement in an oil recovery process comprising injecting a surfactant-containing aqueous fluid into a petroleum-containing formation, for the purpose of displacing petroleum through the formation toward a production well, said fluid displacing petroleum are efficiently and in greater quantities than water of field brine would be capable of accomplishing under similar injection conditions. More specifically, the process of my invention involves a method of treating a surfactant-containing fluid prior to injecting it into a subterranean, petroleum formation by subjecting the fluid to high shear rate for at least a minimum period of time, preferably on the surface, prior to injecting it into the formation. Specifically, I have found that a surfactant fluid should be subjected to a shear rate of at least 150 reciprocal seconds and preferably at least 250 reciprocal seconds for a period of time of at least 0.1 minutes and preferably at least 0.5 minutes, prior to injecting it into the formation. This is substantially greater shear than occurs during normal mixing and pumping during the injection process, and is substantially greater than the shear which results from flowing the fluid through formation flow channels. The surfactant fluid which is especially benefitted by this treatment is an aqueous fluid having a salinity of at least 20,000 parts per million total dissolved solids, which may include substantial quantities of divalent ions such as calcium and magnesium, and containing as the primary surfactant, or essentially the only surfactant, a water soluble sodium, potassium, lithium or ammonium salt of an alkylpolyalkoxy sulfate or an alkylarylpolyalkoxy sulfate having the following formula:

$$RO(R'O)_n SO_3^- M^+$$

wherein R is an alkyl group, linear or branched having from 9 to 25 and preferably from 12 to 18 carbon atoms, or an alkylaryl group, such as a benzene, toluene or xylene having attached thereto at least one alkyl group containing from 9 to 15 carbon atoms, R' is ethylene or a mixture of ethylene and propylene or other higher alkylene with relatively more ethylene than higher alkylene, n is a number from 2 to 10 and preferably from 3 to 7 including fractions, and M is a monovalent cation, preferably sodium, potassium, lithium or ammonium. For any given R, the value of n is chosen so the fluid interfacial tension is less than 200 millidynes per centimeter at the fluid salinity to be employed.

By shearing the surfactant-containing fluid for the prescribed period of time and at the stated shear rate, the turbidity of the fluid is reduced, and the fluid may be injected into lower permeability formations over long periods of time with reduced injectivity or well plugging problems. Moreover, the fluid exhibits greater phase stability as a result of shearing, which increases the period of time that the fluid is effective in the formation while recovering petroleum. Finally, the interfacial tension of the fluid is reduced significantly, which increases its effectiveness as a low surface tension oil displacing fluid.

DETAILED DESCRIPTION OF THE PREFERRED EMBODIMENTS

My invention pertains to an improved surfactant fluid injection oil recovery process, and more particularly to a method of treating the surfactant fluid on the surface prior to injecting it into a subterranean, oil-containing formation for the purpose of improving the phase stability and injectability, reducing the turbidity and increasing the oil displacement effectiveness of the fluid. The fluid properties are improved as described above by subjecting the surfactant fluid to a very high shear rate for a minimum period of time sufficient to accomplish the described objectives. Specifically, the fluid should be subjected to a shear rate of at least 150 reciprocal seconds (sec$^{-1}$) and preferably at least 250 reciprocal seconds. The treating time necessary to accomplish the desired improvement in fluid properties is at least 0.1 minute and preferably at least 0.5 minutes, but in any event, for a period of time at least sufficient to reduce and preferably to eliminate any turbidity in the fluid. The shorter treating periods are most effective with the highest shear rate treatment, within the above described range. The product of shear rate in sec$^{-1}$ and treating time in minutes should be from 15 to 125. The shear rate and time should in any event be sufficient to reduce the turbidity of the fluid.

While other surfactant fluids are benefitted by the process of my invention, I have found that the process described herein is especially beneficial when used in connection with a surfactant-containing fluid which contains relatively high salinity and which contains as the principal or substantially the only surface active agent present therein, a sulfated and ethoxylated surfactant. The salinity of the fluid is normally in excess of 20,000 and usually in excess of 50,000 parts per million total dissolved solids. The total salinity may include appreciable quantities of divalent ions, usually calcium and magnesium, which may be in the range of from 200 to 15,000 parts per million. Generally, the salinity of the surfactant fluid is largely determined by the salinity, including the divalent ion concentration, of the water present in the oil formation into which the surfactant fluid is to be injected. Ideally, the surfactant should be tailored so it exhibits optimum effectiveness for low surface tension oil displacement purposes at the salinity and divalent ion concentration values of the water present in the formation, and the surfactant fluid salinity and divalent ion concentration should be adjusted to a value approaching this same salinity.

The surfactant employed in the fluid to be employed in the process described herein is a water soluble salt of an alkylpolyalkoxy sulfate or alkylarylpolyalkoxy sulfate, having the following general formula:

$$RO(R'O)_n SO_3^- M^+$$

wherein R is an alkyl group, either linear or branched, having from 9 to 25 and preferably from 12 to 18 carbon atoms, or an alkylaryl group, such as a benzene, toluene, or xylene having attached thereto at least one alkyl group, linear or branched, and having from 6 to 18 and preferably from 9 to 15 carbon atoms; R' is ethylene or a mixture of ethylene and higher molecular weight alkylene groups such as propylene, etc., with relatively more ethylene than higher molecular weight alkylene, M is sodium, potassium, lithium or ammonium, and n is a number from 2 to 10 and preferably from 3 to 7. Since the surfactant molecule is frequently a mixture of slightly different compounds with differing alkyl groups and/or differing in the number of ethylene oxide groups attached thereto, n represents the average number of ethylene oxide or alkylene oxide groups, and so n may be an integer or a fraction, representing a weighted average of the various molecular species present. For any given R group, the value of n is chosen so the interfacial tension of the surfactant fluid is no greater than 200 millidynes per centimeter prior to step of shearing the fluid. Surprisingly, shearing reduces the interfacial tension of a fluid where the interfacial tension is initially less than 200 millidynes per centimeter, whereas is a surfactant fluid whose initial interfacial tension is above 200 millidynes per centimeter is sheared, the interfacial tension is not reduced and may even be increased by shearing. The surfactant fluid may also contain trace amounts (0.02–0.5% by volume) hydrocarbons.

It has been found that the above described alkyl or alkylarylpolyalkoxy sulfate salt is a particularly effective surfactant in single surfactant form, and is especially effective for use in displacing oil from formations containing water having relatively high salinities, e.g., water salinities in the range of 20,000 to 225,000 parts per million total dissolved solids. This surfactant can be used in formations whose temperature is at least as high as 120° F. (49° C.).

A preferred method for shearing the surfactant fluid in the field is by pumping the fluid through one or more plates, each having one or more relatively small orifices, e.g., in the range of 0.60 mm (0.0236 in) to 2.0 mm (0.0787 in) diameter, maintaining range of 3,000 KPa (435 psi) to 70,000 KPa (1029 psi). Very high speed rotary mixing devices may also be used. It is preferred that this shearing treatment be applied on the surface since the treatment must be completed prior to the first contact between the fluid and the formation face at the injection well. This sequence is critical in applying my process since the most crucial point where injectivity problems interfere with surfactant flooding is at the formation face, for two reasons. The fluid passing radially outward from the injection wellbase passes through portions of the formation whose cross sectional area increases as the square of the distance from the injection well. Thus, even if the permeability at the formation face is no less than the permeability of the formation at greater distances into the formation, the formation face produces a substantial throttling effect. As an example, the flow restricting effect at the wellbase-formation interface is 1500 times as great as at a distance of 15 feet in the formation. Additionally, permeability loss at the formation face frequently is experienced due to clay swelling or particulate plugging caused by drilling, completion or fluid injection operations. These two effects are additive, and so the fluid shearing treatment must be completed before the fluid contacts the formation face. The shearing step could be accomplished in the injection tubing itself, but the preferred method is to accomplish the shearing on the surface prior to introducing the fluid into the tubing.

In the case of using the above-described preferred surfactant, an alkylarylpolyalkoxy sulfate or alkylpolyalkoxy sulfate, the operable concentration range is from about 0.05 to 10.0 and the preferred range is from about 0.5 to about 2.0 percent by weight.

The volume of surfactant fluid injected is ordinarily from about 5 to about 200 pore volume percent and preferably from about 10 to about 50 pore volume percent. There is generally no technical objection to the use of greater volumes of surfactant fluid than given above, although it is economically unjustified to use a greater volume of surfactant fluid than is sufficient for displacing oil.

EXPERIMENTAL SECTION

For the purpose of demonstrating the nature and magnitude of the improvements in surfactant fluid properties resulting from application of the process of my invention, the following experiments were performed.

Three sulfated and ethoxylated surfactants were evaluated, each at two salinity levels. The surfactants were all sodium salts of dodcylbenzenepolyethoxy sulfate, having 3, 4 and 4.5 moles of ethylene oxide per mole of surfactant. The interfacial tension was determined on an unsheared, aged sample and for a sheared, aged sample. Each of the sheared samples was sheared in a Waring ® blendor for about one minute and aged for one week under quiescent conditions prior to measurement of interfacial tension. The unsheared samples were stirred for 3 hours before aging. The data are given in Table I below.

TABLE I

| INTERFACIAL TENSION MEASUREMENTS SHEARED AND UNSHEARED SURFACTANT FLUID SAMPLES | | | |
|---|---|---|---|
| Run | No. moles ethylene oxide per mole of alkylbenzene-polyethoxy sulfate | Fluid salinity parts per million | Sheared | Interfacial tension, millidynes per centimeter |
| A | 3.0 | 85,000 | no | 50 |
| B | 3.0 | 85,000 | yes | 36 |
| C | 3.0 | 150,000 | no | THTM* |
| D | 3.0 | 150,000 | yes | 1422 |
| E | 4.0 | 85,000 | no | 336 |
| F | 4.0 | 85,000 | yes | 435 |
| G | 4.0 | 150,000 | no | 57 |
| H | 4.0 | 150,000 | yes | 42 |
| I | 4.5 | 85,000 | no | 415 |
| J | 4.5 | 85,000 | yes | 416 |
| K | 4.5 | 150,000 | no | 293 |

TABLE I-continued

| | INTERFACIAL TENSION MEASUREMENTS SHEARED AND UNSHEARED SURFACTANT FLUID SAMPLES | | | |
|---|---|---|---|---|
| Run | No. moles ethylene oxide per mole of alkylbenzene-polyethoxy sulfate | Fluid salinity parts per million | Sheared | Interfacial tension, millidynes per centimeter |
| L | 4.5 | 150,000 | yes | 319 |

*too high to measure.

It can be seen by comparing runs A and B, and runs G and H, that when the degree of ethoxylation of the sulfated and ethoxylated surfactant is such that the interfacial tension is in the desirable low range, e.g., less than 200 millidynes per centimeter, shearing further reduces the interfacial tension. In these cases, turbidity is reduced and injectivity is enhanced. In comparing runs C and D, E and F, I and J, and K and L, when the degree of ethoxylation of the surfactant is not proper for the fluid salinity, as a result of which the interfacial tension of the fluid exceeds the level where efficient oil displacement is achieved, e.g., greater than 200 millidynes per centimeter, shearing does not reduce and in some cases, increases the interfacial tension. So long as the degree of ethoxylation of the surfactant is such that an interfacial tension less than 200 millidynes per centimeter is attained (which is a function of fluid salinity), shearing the fluid for sufficient shear time and shear rate to reduce fluid turbidity reduces fluid interfacial tension. The above applies equally to alkylpolyalkoxy sulfates and to alkylarylpolyalkoxy sulfates.

Thus I have disclosed that treating a fluid containing a preselected water soluble salt of an alkyl or alkylarylpolyalkoxy sulfate in a relatively high salinity environment by subjecting the fluid to high shear for a period of time sufficient to reduce the turbidity of the fluid, significantly increases the effectiveness of the surfactant fluid for low surface tension oil displacement, improves the long term phase stability of the fluid, decreases the injectivity problems associated with injecting surfactant into a subterranean formation for a long period of time, and thereby greatly improves the effectiveness of the surfactant fluid for oil recovery purposes.

While my invention has been described in terms of a number of specific illustrative embodiments, it is clearly not so limited since many variations thereof will be apparent to persons skilled in the related art without departing from the true spirit and scope of my invention. It is my intention and desire that my invention be limited and restricted only by those limitations and restrictions appearing in the claims appended immediately hereinafter below.

I claim:

1. In a method of recovering petroleum from a subterranean permeable, petroleum-containing formation, said formation containing water having a salinity of at least 20,000 parts per million total dissolved solids, said formation being penetrated by at least one injection well and by at least one production well, both wells being in fluid communication with the formation, comprising injecting an aqueous, saline, surfactant-containing fluid into the formation via the injection well to displace petroleum toward the production well, from which it is recovered to the surface of the earth, said fluid containing from 0.05 to 10.0 percent of a surfactant having the following formula:

$$RO(R'O)_n SO_3^- M^+$$

wherein R is an alkyl group, linear or branched, having from 9 to 25 carbon atoms, or an alkylaryl group, containing at least one alkyl constituent, linear or branched, containing from 9 to 15 carbon atoms, R' is ethylene or a mixture of ethylene and higher molecular weight alkylene with relatively more ethylene than higher molecular weight alkylene, n is a number including fractional numbers from 2 to 9, wherein the value of n is selected to achieve a fluid interfacial tension value less than 200 millidynes per centimeter, and $M^+$ is sodium, potassium, lithium or ammonium, the improvement for increasing the phase stability and injectability of the surfactant fluid, and improving its low surface tension oil displacement effectiveness, which comprises:
  shearing the surfactant fluid at the surface at a shear rate of at least 150 reciprocal seconds for a period of time of at least 0.1 minutes, said shear rate and shear time being sufficient to reduce the turbidity of the fluid prior to injecting it into the formation via the injection well.

2. A method as recited in claim 1 wherein the shear rate is at least 250 reciprocal seconds.

3. A method as recited is claim 1 wherein the time at which the surfactant fluid is sheared is at least 0.5 minutes.

4. A method as recited in claim 1 wherein the value of n is selected to cause the interfacial tension of the unsheared surfactant fluid to be less than 200 millidynes per centimeter.

5. A method as recited in claim 1 wherein the alkyl or alkylarylpolyalkoxy sulfate surfactant is substantially the only surfactant present in the fluid.

6. A method as recited in claim 1 wherein the surfactant is sheared at a rate and time at least sufficient to render the fluid essentially non-turbid.

7. A method as recited in claim 1 wherein the product of shear rate in sec$^-$ and time of shearing in minutes is from 15 to 125.

* * * * *